(12) United States Patent
Gracian et al.

(10) Patent No.: US 12,053,740 B2
(45) Date of Patent: Aug. 6, 2024

(54) METHOD AND DEVICE FOR MANAGING A WASTE GAS TREATMENT DEVICE

(71) Applicant: SUEZ GROUPE, Paris la Defense (FR)

(72) Inventors: Catherine Gracian, Puyloubier (FR); Valerie Nastasi, Villebon sur Yvette (FR)

(73) Assignee: SUEZ GROUPE, Paris la Defense (FR)

( * ) Notice: Subject to any disclaimer, the term of this patent is extended or adjusted under 35 U.S.C. 154(b) by 611 days.

(21) Appl. No.: 17/282,431

(22) PCT Filed: Oct. 11, 2019

(86) PCT No.: PCT/EP2019/077646
§ 371 (c)(1),
(2) Date: Apr. 2, 2021

(87) PCT Pub. No.: WO2020/074725
PCT Pub. Date: Apr. 16, 2020

(65) Prior Publication Data
US 2021/0387137 A1    Dec. 16, 2021

(30) Foreign Application Priority Data
Oct. 12, 2018  (FR) ...................................... 1859477

(51) Int. Cl.
*B01D 53/30* (2006.01)
*B01D 53/04* (2006.01)
*B01D 53/14* (2006.01)

(52) U.S. Cl.
CPC ......... *B01D 53/30* (2013.01); *B01D 53/0454* (2013.01); *B01D 53/1412* (2013.01); *B01D 2253/102* (2013.01); *B01D 2257/90* (2013.01)

(58) Field of Classification Search
CPC ........................ B01D 53/30; B01D 53/0454; B01D 53/1412; B01D 2253/102; B01D 2257/90;
(Continued)

(56) References Cited

U.S. PATENT DOCUMENTS 8,392,091 B2 * 3/2013 Hebbale ................... F01N 9/00
                                                    60/274
2005/0129990 A1 * 6/2005 Ozeki ............... H01M 8/04955
                                                   429/513
(Continued)

OTHER PUBLICATIONS

Luyben, William L., "Heat-Exchanger Bypass Control", Industrial & Engineering Chemistry Research, vol. 50, No. 2, Dec. 16, 2010, pp. 965-973.

*Primary Examiner* — Stephen Hobson
(74) *Attorney, Agent, or Firm* — Harness, Dickey & Pierce, PLC

(57) ABSTRACT

The present disclosure relates to the field of odor treatment. In particular, the disclosure relates to a method for managing a waste gas treatment device. The method includes the following steps: a step of taking into account gaseous pollutant concentration predictions at at least one point in a predefined geographical area; a step of comparing each predicted gaseous pollutant concentration at the at least one point of the predefined geographical area with a gaseous pollutant concentration reference value; a step of transmitting, to a control unit of a bypass air line of a waste gas treatment unit, a command to at least partially open the bypass air line when the result of the comparison indicates that at least one predicted gaseous pollutant concentration value is less than a gaseous pollutant concentration reference value.

15 Claims, 5 Drawing Sheets

(58) Field of Classification Search
CPC ...... B01D 2257/708; B01D 2258/0283; B01D 2258/06; B01D 53/02
See application file for complete search history.

(56) References Cited

U.S. PATENT DOCUMENTS

| | | | | |
|---|---|---|---|---|
| 2010/0096108 | A1* | 4/2010 | Castagne | F24F 3/044 |
| | | | | 165/184 |
| 2011/0009986 | A1* | 1/2011 | Page | B01D 53/38 |
| | | | | 702/3 |
| 2011/0258991 | A1* | 10/2011 | Hwang | F01N 3/2066 |
| | | | | 60/295 |
| 2011/0296814 | A1* | 12/2011 | Santoso | F01N 9/00 |
| | | | | 60/272 |
| 2016/0115675 | A1* | 4/2016 | Quigley | E03B 1/042 |
| | | | | 700/282 |
| 2018/0334403 | A1* | 11/2018 | Pardo | B30B 15/00 |
| 2019/0184343 | A1* | 6/2019 | Hagawa | B01D 65/109 |
| 2019/0369595 | A1* | 12/2019 | Fievez | G01P 5/02 |
| 2020/0384145 | A1* | 12/2020 | Nastasi | B01D 53/78 |
| 2022/0355832 | A1* | 11/2022 | Bachman | F03G 7/081 |

* cited by examiner

METHOD AND DEVICE FOR MANAGING A WASTE GAS TREATMENT DEVICE

CROSS-REFERENCE TO RELATED APPLICATIONS

This application is a National Phase Entry of International Patent Application No. PCT/EP2019/077646, filed on Oct. 11, 2019, which claims priority to French Patent Application No. 1859477, filed on Oct. 12, 2018, both of which are incorporated by reference herein.

TECHNICAL FIELD

The present invention falls within the field of the treatment of odors, notably by gas-solid adsorption. In particular, the invention relates to a method for managing a foul-gas treatment device. The invention also relates to a foul-gas treatment device, the method of managing of which allows optimization of consumables, while at the same time taking into consideration the olfactory impact on the environment of emitting a foul gas. More particularly, the invention may be applied to the fields of treatment of waste and wastewater and to any industrial site that emits odors.

BACKGROUND

Wastewater treatment plants, waste treatment plants and certain industrial installations may generate odorous compounds that may, in a certain vicinity, lead to episodes of olfactory nuisance, the significance of which differs according to the conditions of atmospheric dispersion of the odorous compounds. In order to limit the olfactory impact of such installations, the odorous components are ducted through ventilation networks so that they can then be treated by deodorization units. There are different kinds of deodorization methods which can be employed according to the characteristics of the air streams carrying the odorous compounds that are to be treated. The characteristics of the air streams are, notably: the type of odorous molecules contained in the air streams, the concentration of these modules in the air stream and the flow rate of the air stream.

The following may be cited amongst these methods:
chemical scrubbing;
biofiltration and equivalent bioprocesses;
thermal oxidation;
adsorption, either as a main treatment method or as a finishing method following a chemical scrubbing or biofiltration for example.

The method using adsorption onto porous media, notably employing active carbon, is particularly effective in eliminating the vast majority of odorous molecules and volatile organic compounds, otherwise known as VOCs, present in an air stream. The principle of treatment by adsorption is to cause the air stream that is to be treated to pass through a bed made up of an adsorbent medium in which the odorous molecules are captured. As it is used, the adsorbent medium becomes saturated and becomes increasingly less able to adsorb the odorous molecules. The adsorbent medium therefore needs to be replaced when its adsorption capacity is no longer sufficient. The adsorbent medium is therefore replaced with a fresh charge. The spent adsorbent medium then has to be reprocessed using waste treatment methods. Alternatively, the medium may be regenerated, but the regeneration methods consume a great deal of energy and are therefore not very economical.

These solutions are notably described in the following publications: "Traitement des odeurs, Procédés curatifs", P. Le Cloirec, J L Fanlo, C. Gracian—Techniques de l'ingénieur Gestion des odeurs et des nuisances olfactives, G2971, 2003; "Pollution olfactive, sources d'odeurs, cadre réglementaire, techniques de mesure et procédés de traitement: Etat de l'art. Rapport final" J L Fanlo, J. Carre—RECORD Study No. 03-0808//0809/1A, 2006.

These solutions are effective at treating odorous emissions and therefore at limiting a potential risk of a negative olfactory impact on the environment of an air stream emission source. However, these solutions consume a great deal of energy, of water, of chemical reagents and of other consumables. Furthermore, these solutions generate waste resulting from the chemical scrubbing or from the adsorption, or else greenhouse gases notably in the case of thermal oxidation methods or bioprocesses.

In parallel with the treatment of the ducted air streams containing olfactory pollutants, it is possible to diagnose and monitor the olfactory impact caused by various odor emission sources, for example of a water treatment plant or of an industrial site. To do that, software simulating the atmospheric dispersion of the odorous molecules, relying on meteorological data measured in real time, and on the topography of the odor emission site and its surroundings is used.

For example the Azurair™ Scan product, marketed by Suez International, allows real-time monitoring of the olfactory impact of an odor emitting site on its environment. The Azurair™ Scan product comprises a platform modeling the atmospheric dispersion of odorous molecules, which may optionally be associated with an array of ambient-air sensors, notably $H_2S$ and $NH_3$ sensors. The Azurair™ Scan product associated with an array of ambient-air sensors provides real-time knowledge of the odorous molecules emission data. This means that the monitoring of the olfactory impact of the emissions of odorous molecules can be adjusted, maintenance actions programmed to minimize the olfactory impact, and the alert of the operator of the odor emitting site in the event of abnormally high olfactory-molecule concentrations being measured for example. Using these systems, the odorous compounds are eliminated constantly even when the atmospheric conditions are enough to avoid any risk of odors in the environment.

Other software has been developed to forecast the impact of the emission of odorous molecules, notably by taking meteorological forecast data into consideration to carry out calculations predicting the dispersion of the odorous molecules. For that, such software employs meteorological forecasting data in the dispersion calculations rather than data captured in real time.

The objectives of such tools are:
to ensure continuous monitoring of the olfactory impact of the plant on its environment, with the results being refreshed every half hour,
to provide 48-h forecasts of the olfactory impact of the plant on its environment,
to assist the operators with planning operations carrying risk of odors in order to limit such risk as far as possible, and
to inform neighbors of the risks of olfactory nuisance.

This type of tool is notably described in the following publications: "Tool for Predicting and Monitoring the Impact of Wastewater Treatment Plants on Odour" I. Isaac-Ho Tin Noe, F. Siino, C. Bara, Y. Urvoy, C. Haaser, A. Tripathi, L. Ait Hamou, T. Mailliard-NOSE 2010-22-24 Sep. 2010 Florence, Italy, AIDIC Publications; "Tool for Predicting and Monitoring the Impact of Wastewater Treatment Plants on Odour" I. Isaac-Ho Tin Noe, F. Siino, C. Bara, Y. Urvoy, C. Haaser, A. Tripathi, L. Ait Hamou, T. Mailliard-NOSE 2010-22-24 Sep. 2010 Florence, Italy, AIDIC Publications.

More recently, a software package (PrOlor) has been developed to forecast the olfactory impact of an industrial site. This tool allows operators to anticipate the actions that need to be undertaken in order to control the emissions of odors. This tool supposedly makes it possible to limit expenditure by treating the odors only when there is a risk of olfactory impact, and would do so by:

reducing the electrical power consumption of the fans,
reducing the consumption of reagents in the chemical scrubbers,
reducing the consumption of fuel in the thermal oxidizers.

Implementation and e system are not explained, and no reference is identified.

This tool is described in the following documents:
"Comparison of predicted versus real odor impacts in a rendering plant with PrOlor", Carlos N. Diaz Jiméneza, Cyntia Izquierdo Zamorab, David Cartelle Fernándeza, Jose M. Vellón Grañaa, Ángel Rodriguez López-NOSE 2016 14-17 Sep. 2016, Ischia, Italy, AIDIC Publications and
http://prolor.net/index.php/solutions/savings However, this solution, while it does mention the possibility of reducing the OPEX of deodorizing units, does not provide driven control of the operation of the deodorizing units.

Documents U.S. Patent Publication No. 2011-0258991, U.S. Patent Publication No. 2011-296814, U.S. Patent Publication No. 2010-096108 describe devices comprising a bypass allowing a main treatment system to be bypassed in various domains of treatment notably of gases, although these documents do not describe proactive control but only reaction to actual measurements, leading to a delay in the control response time. Also, the collection of existing tools is unable to lessen the ecological impact either in terms of recycling or in terms of the energy consumption of the methods for treating air streams containing odorous molecules.

SUMMARY

One aim of the invention is notably to propose a rationalization of the use of a unit for deodorizing an air stream containing odorous molecules according to the risk of olfactory impact on the environment of the site emitting this stream of air referred to as foul air. To this end, the present invention proposes a method for managing a foul gas treatment device. The foul gas treatment device notably comprises:

a) a gas treatment unit, said treatment unit possibly comprising a dispersion stack,
b) a bypass air line bypassing said treatment unit
c) a control unit for said bypass air line in bypass mode of at least part of the treatment unit,
d) a computer implementing said method for managing the gas treatment device.

Said method for managing the gas treatment device according to the invention comprises at least the following steps:

a step whereby at least one processor of the computer takes into consideration forecasts of gaseous pollutant concentrations at at least one point of a predefined geographical zone;
a comparison step, implemented by the at least one processor, of comparing the predicted gaseous pollutant concentration at the at least one point of the predefined geographical zone with a gaseous pollutant concentration reference value;
a step in which the computer transmits to the bypass air line control unit an instruction to at least partially open the air line bypassing the gas treatment unit when the result of the comparison indicates that at least one predicted gaseous pollutant concentration value is below a gaseous pollutant concentration reference value;

said method being repeated at defined time intervals.

Thus, this allows the gas treatment unit not to be used when its use is not required. Specifically, the method according to the invention allows the odorous air to be treated only when the meteorological conditions are unfavorable to sufficient dispersion of the emitted odors. Thus, for the same performance, the OPEX, the production of waste and the equipment maintenance time will be reduced.

The method for managing a foul gas treatment device according to the invention may further comprise:
a step in which the computer receives forecast meteorological data;
a step whereby a model of the atmospheric dispersion of the foul gas molecules as a function of the forecast meteorological data received and of a predefined concentration of untreated discharged odorous pollutants forecasts gaseous pollutant concentration values at the at least one point in the predefined geographical zone, said model being implemented by the processor.

This then allows control over the precision of the algorithm that predicts the gaseous pollutant concentration values which defines whether the treatment unit is used or bypassed.

The model of the atmospheric dispersion of the foul gas molecules over the predefined geographical zone takes account of the topography of said predefined geographical zone, such as its relief, the layout of the zone, namely the presence of buildings, dwellings, woods, watercourses. This is because the topographical elements may have an impact on the atmospheric dispersion of the molecules of foul air and also on the greater or lesser level of tolerance toward air containing odorous molecules.

The method for managing a foul gas treatment device according to the invention may further comprise:
a step of receiving at least one gaseous pollutant concentration value measured by at least one sensor;
a step of comparing the at least one measured gaseous pollutant concentration value with the gaseous pollutant concentration reference value;
a step of transmitting to the control unit that controls the air line bypassing the treatment unit, of a command to at least partially close the bypass air line, when the result of the comparison indicates that at least one measured gaseous pollutant concentration value is above the gaseous pollutant concentration reference value.

The method thus allows the bypass line to be closed if proven pollution is detected when it had not been forecast, or forecast with a lesser intensity. The use of sensors allows additional safety to be added to the method according to the invention. The gaseous pollutant concentration reference value, or odorous gas, may advantageously differ according to the position of the point in the predefined geographical zone. Advantageously, this allows the gas treatment unit not to be used when a level of gaseous pollutant, exceeding a defined threshold, or reference value, is detected over a geographical zone that is not critical.

The gaseous pollutant concentration reference value may be a concentration target value below a maximum permissible value or else equal to the maximum permissible value. This for example makes it possible to ensure better air quality than that imposed by regulatory standards.

The forecast meteorological data taken into consideration during the step of predicting the gaseous pollutant concentration values notably comprise: a temperature, a wind speed and direction, a level of cloud cover or a level of solar radiation, at the at least one point in the predefined geographical zone. Advantageously, it is also possible to take account of the meteorological data from sensors in real time, and compare these against the forecast data in order to detect a deviation in the forecast meteorological data received, which could lead to a poor prediction of the pollutant concentrations. On detection of a significant deviation, the method according to the invention allows the treatment bypass line to be closed in order to avoid potential atmospheric pollution.

The emission-source characteristics taken into consideration during the prediction step are dependent on the gaseous pollutant concentration in the discharged gas. This parameter may be defined beforehand according to knowledge of the process upstream. Advantageously, it is possible to take the actual characteristics of the emission source into consideration by using a sensor that measures the pollutant concentration in the discharge stack so as to detect an abnormally high emission of odorous pollutants which could lead to a poor prediction of the pollutant concentrations in the predefined geographical zone. On detection of an abnormally high odorous pollutant concentration value, the method according to the invention allows the treatment bypass line to be closed in order to avoid potential atmospheric pollution.

The gas-treatment device may further comprise a gas-dispersion unit downstream of the gas-treatment unit according to the direction of flow of the air flow through said gas-treatment device, said dispersion unit being situated downstream of the outlet of the bypass airline. Said method according to the invention may then comprise a step of adjusting the air flow rate of the gas-dispersion unit according to the calculation for predicting a gaseous pollutant concentration value at the at least one point of the predefined geographical zone. Advantageously, this makes it possible to improve the dispersion of the molecules of the molecules of odorous gas when these are present, and reduce the energy consumption of the dispersion unit when there is no need to add a dispersion effect to the gas leaving the stack.

The defined time interval may be of the order of around 15 minutes. This time interval corresponds to the time interval for making comparisons between the forecast or actual concentrations, namely in this case concentrations from sensors, and a reference value. Another time interval to be taken into consideration is the time interval for receiving the forecast meteorological data. This time interval may be greater than the comparison time interval, for example of the order of one hour. The comparison time interval may, for example, correspond to the time interval of the forecast meteorological data. Advantageously, this makes it possible to improve the temporal precision with which the odorous molecule concentrations are forecast and therefore improve the responsiveness of the method for opening/closing the bypass line.

The present invention also relates to a foul gas treatment device implementing the device management method according to the invention. Said foul gas treatment device according to the invention notably comprises:

a gas treatment unit;
a bypass airline bypassing at least a part of the gas treatment unit;
a computer comprising at least one processor able to calculate instructions at least for opening and closing the bypass airline according to data forecasting the concentration of gaseous pollutants in a predefined geographical zone;
a control unit controlling the bypass airline and able to receive instructions to open and close the bypass airline coming from the processor and able to apply said instructions to open and to close the bypass airline.

The device according to the invention allows the gas treatment unit to be not used when its use is not required. The at least one processor is notably connected to an interface dedicated to receiving data forecasting the concentration of gaseous pollutants in the predefined geographical zone. Advantageously, it is thus possible to use an existing gaseous-pollutant dispersion forecasting module.

The at least one processor is notably able to calculate forecast concentrations of gaseous pollutants over said predefined geographical zone, said at least one processor being then connected by a dedicated interface to a meteorological data server. Thus, it is possible to make predictions of the dispersion of molecules of odorous gas by controlling the precision of the prediction algorithm. The at least one processor is connected via dedicated interfaces to one or more sensors included among:

odorous gas sensors distributed over said predefined geographical zone;
meteorological data sensors;
an odorous gas sensor arranged at a discharge stack of the foul gas treatment device.

The use of sensors allows the use of a bypass device of gas treatment unit that is both precise and reliable. The at least one part of the gas treatment unit may be a filtration unit. Advantageously, such a unit has no inertia with regard to the starting-up of the treatment and the stopping of said treatment. This allows the device to become immediately inactive in a bypass situation and immediately active when at least part of the treatment unit is not bypassed.

The treatment unit according to the invention can be used alone or in combination with other conventional treatment units such as, for example, one or more chemical scrubbing towers. The filtration unit used may be selected from an adsorption filtration unit and/or a unit performing a physicochemical treatment on the gas. An example of an adsorption filtration unit is an active carbon filter. An example of a unit performing physicochemical treatment of gas is notably a physicochemical scrubber unit, such as a chemical scrubbing tower; this may, depending on the pollutant(s) to be eliminated, perform an acid chemical scrubbing (notably using sulfuric acid $H_2SO_4$), an alkaline chemical scrubbing (notably using sodium hydroxide NaOH), a chemically oxidative scrubbing (notably using sodium hypochlorite NaClO), or a chemical reduction scrubbing (notably using bisulfite $NaHSO_3$, or thiosulfate $Na_2S_2O_3$).

The foul gas treatment device may also comprise a gas dispersion unit downstream of the gas treatment unit according to the direction of flow of the gas through the gas treatment device, said dispersion unit then being situated downstream of the outlet of the bypass airline. The control unit may command the opening and closing of a motorized damper on the bypass airline. The foul gas treatment device may further comprise an active ventilation device arranged upstream of the gas treatment unit and of the inlet of the bypass airline. Said active ventilation device may be equipped with a controllable variable frequency drive, able to take account of a rotational frequency instruction calculated according to a degree of opening of the motorized damper of the bypass line.

One of the advantages of the present invention is that it offers a mode of automated management of a foul gas treatment device comprising an active treatment mode and a mode in which part or all of the active treatment is bypassed. The switch from one mode to the other is performed automatically as a result of a short-term forecast of the dispersion of olfactory pollution. Advantageously the use, in parallel, of data acquired in real time makes it possible to safeguard against a potential error or deviation in the forecast, which could for example be due to erroneous meteorological forecasting.

BRIEF DESCRIPTION OF THE DRAWINGS

Further advantages and features of the invention will become apparent from examining the detailed description of the nonlimiting embodiments and the appended drawings, in which.

DETAILED DESCRIPTION

The chief objective of the present invention is to improve the management of devices for treating odors, and notably odors present in the gases discharged by installations. For example, waste reprocessing installations, purification stations or other plants are liable to emit odorous compounds considered as undesirable to a population living in the vicinity of such a gas emission source. The invention notably improves the management of the waste from the odor treatment devices, lengthening the lifespan thereof. Thus, for example, treatments using beds of carbon will not need to be changed or regenerated as frequently as in conventional odor treatment installations.

Figure 1A:
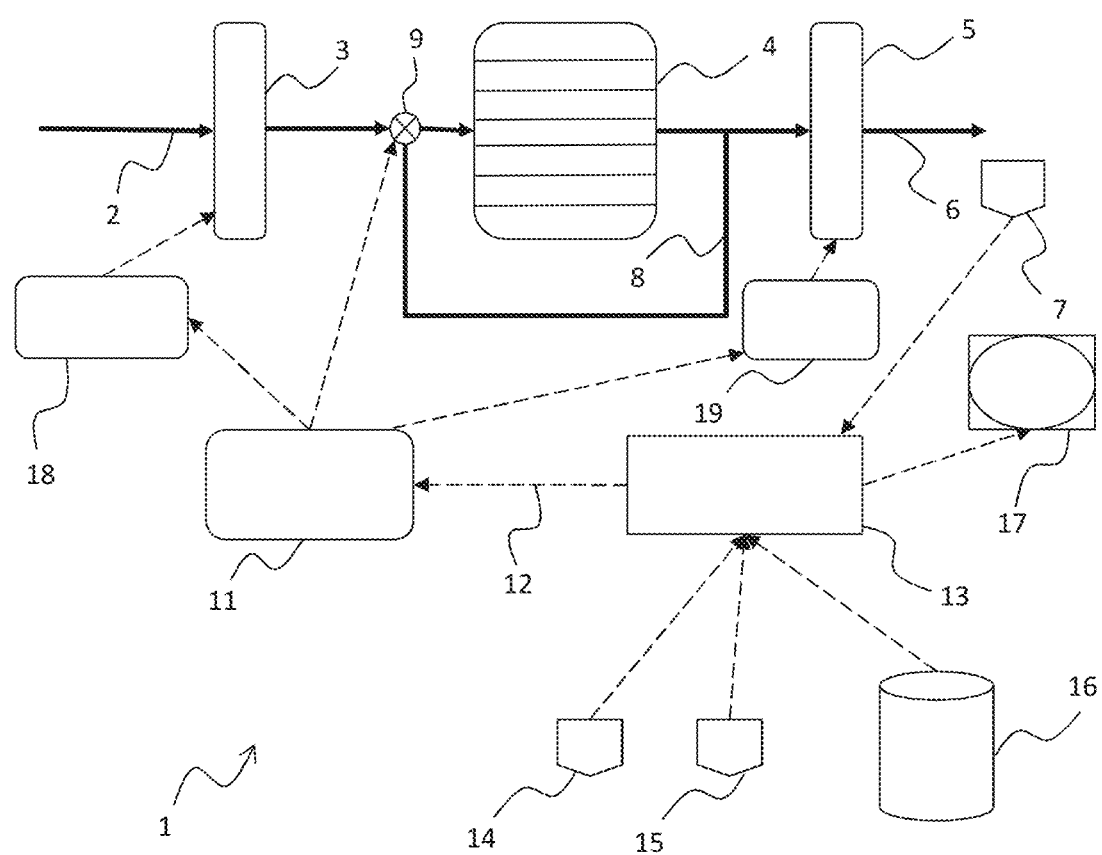
FIG. 1a depicts a schematic example of a foul gas treatment device according to the invention.

FIG. 1a depicts an example of various components of an odor treatment device 1 according to the invention. The odor treatment device 1 takes in at inlet an air stream 2. The incoming air stream 2 is drawn in by an active ventilation device 3 in order to be ducted toward a gas treatment unit 4. The gas treatment unit 4 may be made up of various physicochemical treatments, the objective of which is to eliminate odorous molecules from the incoming air stream 2. For example, the gas treatment unit 4 may comprise several active carbon stages through which the incoming air stream 2 will pass. The gas treatment unit 4 may also comprise chemical scrubbing towers. For example, the gas treatment unit 4 may comprise three chemical scrubbing towers of which a first tower may be an acid scrubbing tower, a second tower may be a bleach/sodium hydroxide scrubbing tower and a third tower may be a sodium hydroxide/sodium thiosulfate scrubbing tower.

The air stream rid of the odorous molecules is then directed toward a gas discharge stack. The discharge stack may optionally be associated with a gas dispersion unit 5. The gas dispersion unit 5 makes it possible to increase the speed at which the emitted gases are ejected. An air stream 6 leaving the stack may be examined by an odorous gas sensor 7 at the stack outlet. The stack outlet sensor 7 is able to detect a discharge of gas that is abnormally heavily loaded with odorous molecules.

The invention proposes a device, and an associated method, for managing the gas treatment device using a bypass line 8 bypassing at least part of the treatment unit 4 when the current and forthcoming odorous gas molecule concentrations are acceptable and at the same time there is therefore no risk of atmospheric pollution through the presence of undesirable odors. The air leaving the active ventilation device 3 is therefore directed either toward the bypass line 8 or toward the entirety or part of the gas treatment unit 4. The routing of the air leaving the active ventilation device 3 will be performed by a motorized damper 9. Alternatively, the active ventilation device 3 may be situated between the inlet of the bypass line 8 and the inlet of the at least part of the gas treatment unit 4 that is bypassed by said bypass line 8.

The opening of the damper 9 may be partial or complete. The motorized damper 9 is commanded by a control unit 11. The control unit 11 takes into account instructions 12 coming from the calculation processor.

The odor treatment device 1 further comprises a calculating computer 13 or calculator 13. The calculator 13 comprises at least the calculation processor and various interfaces collecting data used by said at least one calculation processor. The computer 13 may also comprise one or more volatile or non-volatile data storage units, accessed by said at least one processor.

The at least one calculation processor may in one embodiment comprise one or more calculation cores. The calculation processor implements various steps of the method according to the invention.

The processor may receive at input measurement data coming from several types of sensors, and from several sensors of each of the sensor types. A first sensor may be an odorous gas sensor 7 at the outlet of the stack of a gas emitting installation. A second sensor type 14 may be an odorous gas sensor positioned in an environment of the gas emission source. A third type of sensor 15 may comprise one or more meteorological data sensors placed in the environment of the gas emission source. Taking into account data coming from the various sensors 7, 14, 15 and the very presence of said sensors 7, 14, 15 are optional within the context of the present invention.

The computer 13 receives, via a dedicated data link, meteorological forecasting data coming from a remote meteorological forecasting data server. The processor takes these meteorological forecasting data into consideration to create a forecast of the atmospheric dispersion of the odorous molecules in the environment of the source of the gas. Predicting the atmospheric dispersion of the odorous molecules makes it possible to obtain gaseous pollution concentration forecast data. According to the forecast concentration of gaseous pollutants, the processor is able to calculate an instruction to open or close the bypass line 8.

In another embodiment, the processor may receive gaseous pollutant concentration forecast data t at have already been calculated. In this case, a connection to a remote meteorological forecast data server is not needed.

The processor may formulate a presentation of the current atmospheric situation according to the data from the first and second sensors 7, 14 and from a forecast atmospheric situation, on the basis of the forecasting calculations performed. The atmospheric situation notably comprises a concentration of odorous molecules at various points in the environment of the gas emitting source. These atmospheric situation data may then be transmitted to a data visualization interface connected to the computer 13, in order to present them to an operator for example. Examples of representations of atmospheric situations are given in FIGS. 3a, 3c, 4a and 4c.

The control unit 11 may also be called upon to provide instructions to adapt the rotational frequency of the active ventilation device 3 according to the positioning of the controlled damper 9. Specifically, when the damper 9 is open, for example partially, this leads to a pressure drop which requires a higher rotational frequency of the ventilation device 3 in order to convey a portion of the air stream with the necessary pressure for it to pass through the various physicochemical treatment processes of the gas treatment unit 4. To this end, the control unit 11 may transmit a rotational frequency instruction to a variable-frequency drive 18 controlling the active ventilation device 3. It is also possible, via the control unit 11, to control a flow rate variation device 19 of the dispersion unit 5 in order to accelerate or slow the speed of ejection of the gases leaving the stack, for example according to forecasts of the atmospheric dispersion of the odorous molecules.

Figure 1B:
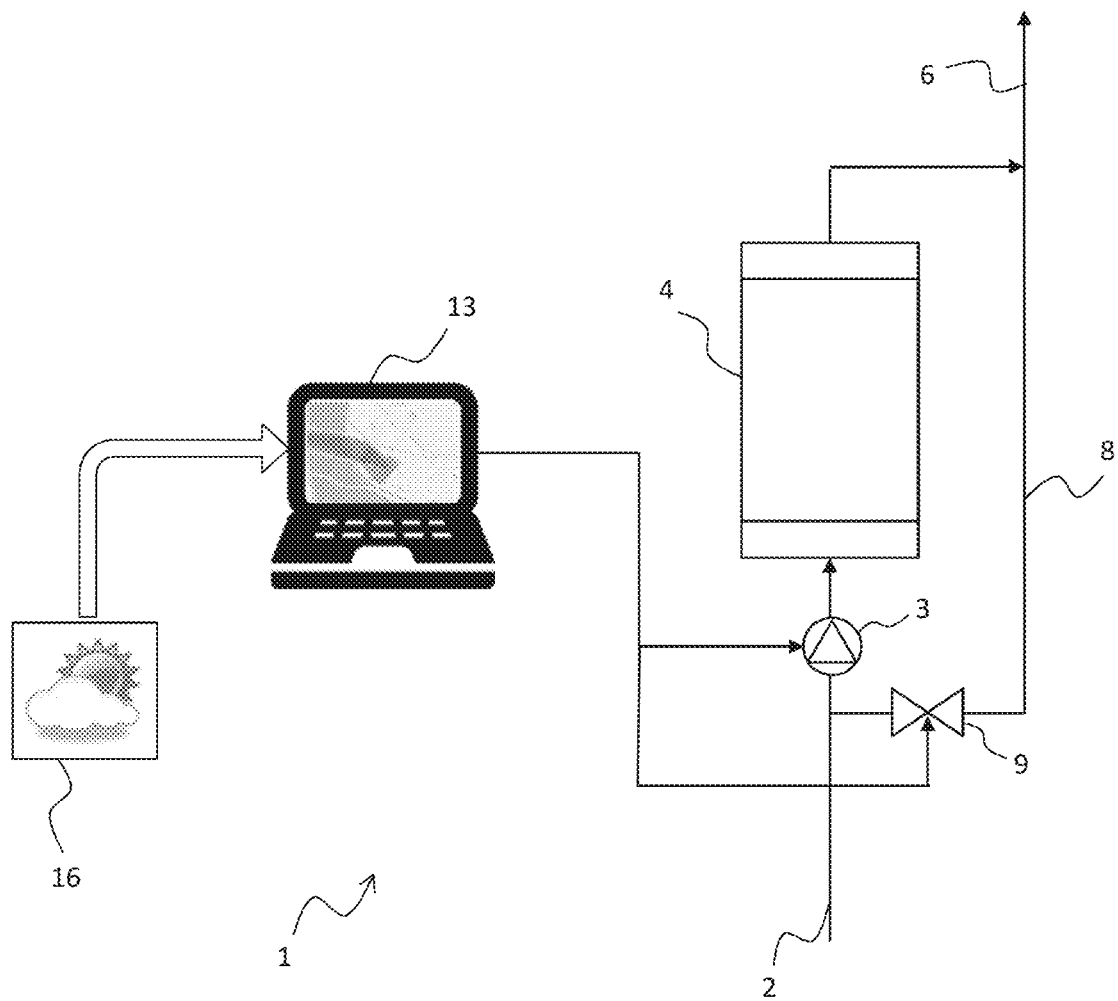
FIG. 1b depicts a first example of an embodiment of the foul gas treatment device according to the invention.

FIG. 1b depicts a first example of the implementation of the odor treatment device 1 according to the invention. FIG. 1b depicts the odor-treatment device 1 according to a minimum configuration for implementing the invention. Thus, the odor treatment device 1 comprises a computer 13 having a display means for displaying the composition of the air in terms of odorous molecules in a zone surrounding a gas emission zone.

The odor treatment device 1 according to the invention also comprises a gas treatment unit 4 and a bypass airline 8 bypassing the gas treatment unit 4. The odor treatment device 1 is tasked with deodorizing the foul air 2 entering said device. An outlet of the gas treatment unit discharges the treated air 6. The bypass airline 8 can be opened/closed completely or partially by a damper 9 commanded by the computer 13.

The computer 13 may also command an active ventilation device 3 which may be placed at the inlet of the gas treatment unit 4. The active ventilation device 3 makes it possible to compensate for a possible loss of pressure head in the gas-treatment unit 4 when the damper 9 is partially or completely closed. The computer 13 in this embodiment may comprise the control unit 11.

Figure 1C:
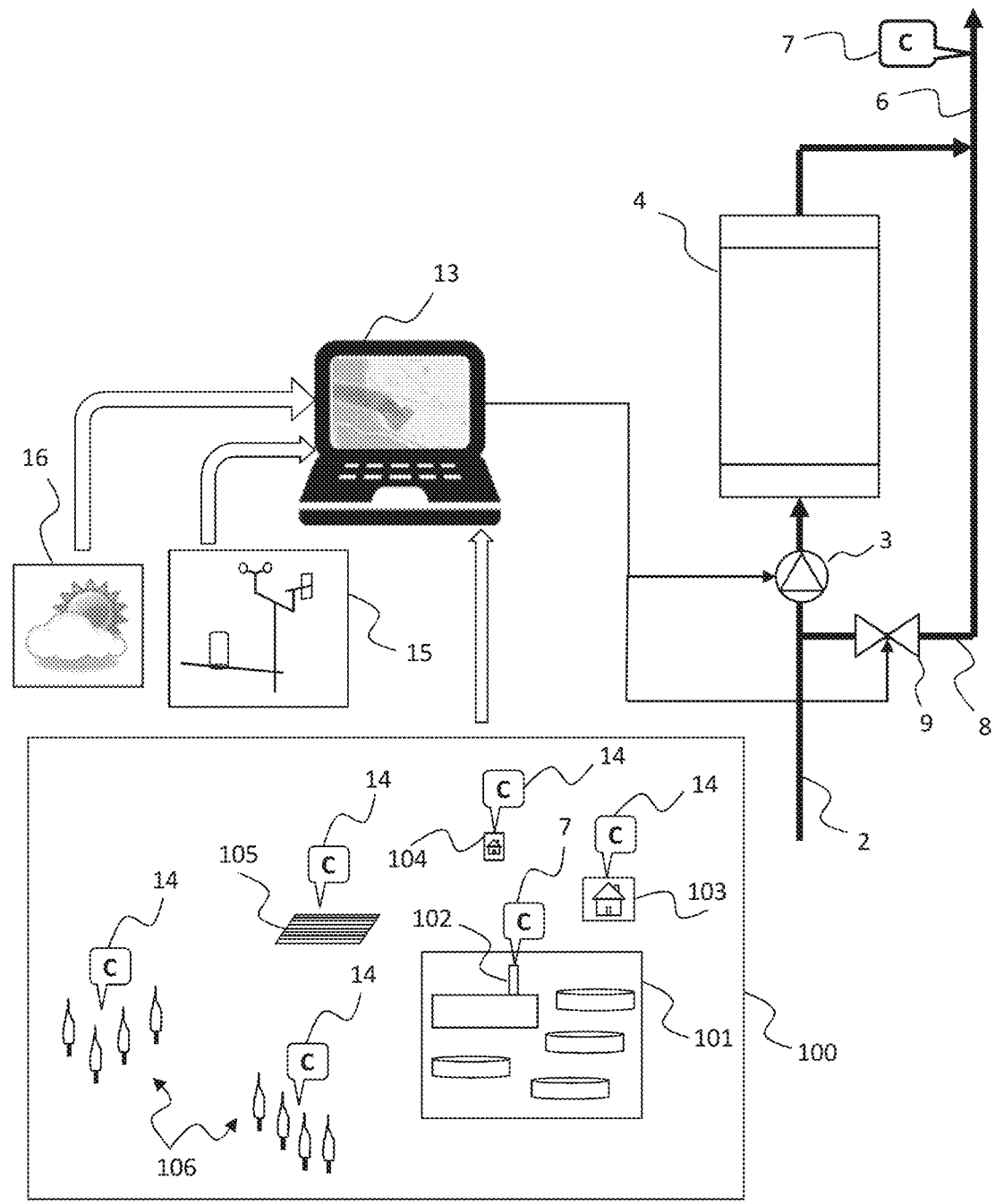
FIG. 1c depicts a second example of an embodiment of the foul gas treatment device according to the invention.

FIG. 1c depicts a second example of an implementation of an odor treatment device 1 according to the invention. FIG. 1c depicts the odor treatment device 1 according to the first embodiment example, supplemented by sensors 7, 14, 15 for implementing the invention.

As in FIG. 1b, the odor treatment device 1 comprises a computer 13 having a display means for displaying the composition of the air in terms of odorous molecules in a zone surrounding a gas emission zone. The odor treatment device 1 according to the invention also comprises a gas-treatment unit 4 and a bypass airline 8 bypassing the gas-treatment unit 4. The odor treatment device 1 is tasked with deodorizing the foul air 2 entering said device. An outlet of the gas treatment unit discharges the treated air 6. The bypass airline 8 can be opened/closed completely or partially by a damper 9 commanded by the computer 13. The computer 13 may also command a fan 3 placed at the inlet of the gas treatment unit 4.

In this embodiment, the computer 13 may comprise the control unit 11. The computer 13 may have input interfaces for data coming from various sensors: for example a collection of meteorological sensors 15, odorous gas sensors 14, a stack sensor 7 placed in a gas outlet stack 102. The stack sensor 7 is an odorous gas sensor.

The various odorous gas sensors 14 may be arranged at various points in a predefined geographical zone 100. The geographical zone 100, in the example depicted in FIG. 1c, is a zone surrounding a purification station 101. The purification station 101 comprises multiple treatment devices including a gas treatment device comprising a stack 102 on which the stack odorous gas sensor 7 is installed. For example, in FIG. 1c, odorous gas sensors are positioned in the wooded zones 106, cultivated fields 105, and zones containing dwellings 103, 104. Furthermore, the computer 13, is able to collect data from various meteorological sensors 15.

Figure 2:
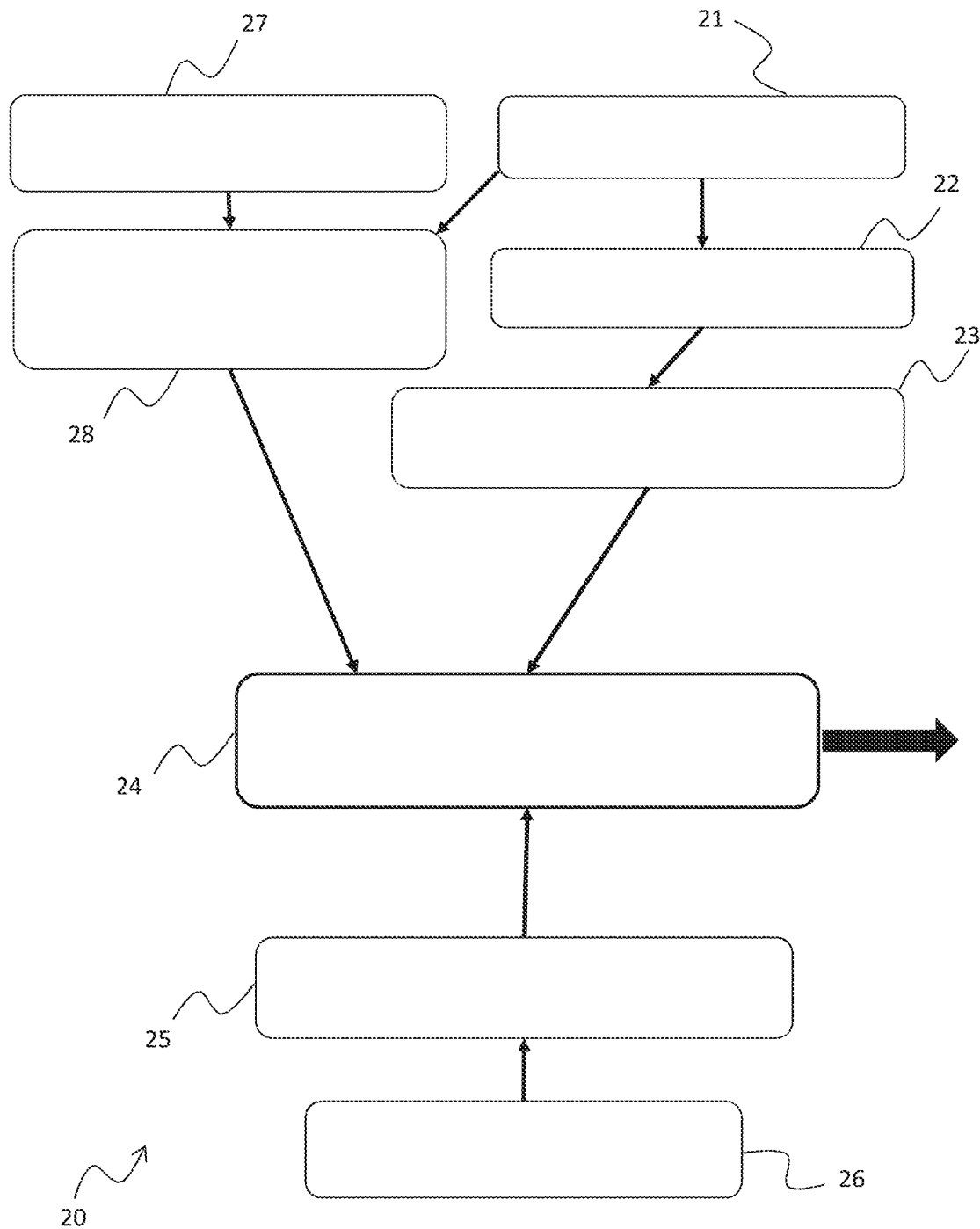
FIG. 2 depicts various possible steps in the method for managing the foul gas treatment device.

FIG. 2 depicts various possible steps in the method 20 for managing the gas treatment device 1 according to the invention. A first step 21 is a step in which the calculation processor, or calculator, receives meteorological forecasting data coming for example from a remote meteorological forecasting data server 16. The meteorological forecasting data received are data relating to temperature, wind speed and direction, cloud cover or solar radiation. These data relate to at least one point in the predetermined geographical zone for which all of the calculations described hereinafter are performed. Other meteorological data may be taken into account depending on the dispersion model used, such as the temperatures and the wind speeds at various altitudes at a point in the predetermined geographical zone, for example.

The meteorological forecasting data are supplied to the calculator regularly, for example every three hours or every hour. These forecasts cover a defined period, for example, of 48 hours, with data calculated at time intervals of around 15 minutes for example. The calculator 13 may take the data into consideration at a time interval of from 5 minutes to 1 hour for example, and preferably of around 15 minutes, and so it is possible to establish a short-term forecast of how the atmospheric pollution situation in terms of odorous particles will evolve.

A second step 22 of the method according to the invention is a step of forecasting an atmospheric dispersion of the odorous molecules at various points of the predefined geographical zone. Forecasting the atmospheric dispersion of the odorous molecules makes it possible to obtain gaseous pollution concentration forecast data.

Characteristics of the gas emission source are taken into consideration during the prediction step 22 as input data into the odorous gas molecules concentration prediction model.

The characteristics of the gas emission source may depend on the concentration of gaseous pollutants in the gas discharged. The characteristics of the gas emission source may be defined beforehand according to knowledge of the air treatment process performed upstream of the discharging of the gases into the atmosphere. It is equally possible to determine the characteristics of the gas emission source during a measurement campaign performed beforehand.

Alternatively, the characteristics of the gas emission source may come from the stack sensor 7, or even from two sensors, one before the treatment of the gas and the other at the outlet of the gas treatment. In instances in which only the stack outlet sensor 7 is present, the characteristics of the gas emission source will be determined from the latest measurements performed by the outlet sensor with the gas treatment bypass line 8 fully open.

The predicted values for the odorous gas molecules concentration are calculated for various grid points of said geographical zone (100). The grid size may be defined for example according to the topography of the geographical zone. The grid may be uniform or nonuniform. For example, two adjacent points on the grid may be distant by one kilometer. The grid comprises at minimum one point.

Other information may enrich the grid of the geographical zone, such as the type of terrain or the use of the ground at each point on the grid: for example whether there are dwellings, forests, crops or industrial zones. Thus, each point of the grid may be associated with a data set including the type of terrain. For a uniform grid, a grid interval may be dependent on the geographical precision desired for the calculations predicting the concentration of odorous molecules and on the speed of execution of the calculations necessary for the effectiveness of the implementation of the method according to the invention.

The step 22 of predicting gaseous pollutant molecule concentration values may employ several types of algorithms for forecasting the atmospheric dispersion of molecules: models of Gaussian, Lagrangian or Eulerian type. For example, it is possible to use the Gaussian models ADMS, AERMOD. The prediction step 22 therefore consists in calculating, for each time interval of the forecast meteorological data, for a concentration value for a gaseous pollutant emitted from the stack, defined beforehand, a forecast value for the concentration of gaseous pollutants, and to do so for each point of the grid of the predetermined zone.

Gaussian-type predictive models require input meteorological forecasts for just one point of the predetermined geographical zone. The prediction calculations are therefore rapid and use little by way of input data. Alternatively, it is possible to employ more complex meteorological forecasting data at input for predictive models of Eulerian or Lagrangian type. For example, it is possible to utilize a meteorological forecasting file containing field wind data from the predefined zone with a precision suited to the prediction model used.

A third step 23 of the method according to the invention is a step of comparing, for each point of the grid and for each forecasting time interval, the forecast gaseous pollutant concentration against a reference value associated with said grid point. The gaseous pollutant concentration reference value may differ according to the different grid points. In general, each grid point is associated with one reference concentration.

Several concentration reference values may thus be defined for the various grid points. For example, it is possible to provide reference values that differ according to the type of terrain: terrain covered with vegetation will allow a reference or tolerance value that is higher in comparison with terrain covered with dwellings for example. It is also possible to define reference values that differ according to seasonal aspects.

The reference value for the concentration of gaseous pollutants may be a concentration target value, lower than a maximum permissible value, or else equal to the maximum permissible value. In general, the maximum concentrations of odorous pollutants at the various grid points are defined according to standards that sites emitting gas streams have to meet. It is therefore possible to adopt as reference value the maximum value defined by the standard or else a target value lower than that permitted by the standard.

When, at the end of the third step 23, a gaseous pollutant concentration at at least one grid point, for one of the forecasting time intervals, is above its reference concentration, then an instruction 24 to close the bypass airline is transmitted to the control unit that controls the bypass airline 8, for the time interval concerned. Alternatively, if, at the end of the third step 23, for all the grid points and for a forecasting time interval, the gaseous pollutant concentration value is below the reference value associated with that grid point, then an instruction 24 to open the bypass airline may be transmitted to the control unit 11 that controls the damper 9 on the bypass airline 8 for the time interval concerned.

For each instruction transmitted to the control unit 11, a frequency instruction is calculated and transmitted to the active ventilation device 3 by the control unit 11 for example, in order to compensate for the drop in pressure associated with opening the bypass airline 8 for example. Should it prove necessary to improve the dispersion of the molecules as a result of a detection that a reference concentration value is currently being or will shortly be exceeded, then it is possible to send to the dispersion unit 5 a command to vary the flow rate of the air discharged. This command may for example be transmitted by the control unit 11 to the flow rate-varying device 19 of the dispersion unit 5.

It is also possible, when the concentration levels are below a maximum reference value but above a target value, for example, to provide an instruction to partially open or to partially close the bypass line. For example, the opening of the controlled damper 9 may be by 50%.

The method according to the invention may also comprise steps providing the gas treatment device with an additional level of safety notably with regard to perceived odorous pollution or when the forecasting meteorological data prove to differ, by an amount greater than a defined tolerance, from the measured meteorological data, or else when the concentration of odorous pollutants measured in the discharge stack is above a discharge concentration value defined beforehand. Thus, the method may comprise a step of receiving meteorological data 27 measured by at least one meteorological data sensor 15. If the comparison 28 with the predicted meteorological data differs by more than the defined tolerance value, then an instruction to close the bypass line 8 may be transmitted directly to the damper 9.

The method 20 according to the invention may also comprise a step 27 of receiving and taking into consideration gaseous pollutant concentration values measured by the gaseous pollutant sensor 7 at the outlet of the stack. If the comparison 28 with the reference value associated with the stack outlet sensor 7 indicates that the actual concentration of odorous pollutants is above said reference value then an instruction 24 to close the bypass line 8 may be transmitted directly to the damper 9. Advantageously, it is therefore possible to take account of the actual characteristics of the emission source through the use of a sensor that measures pollutant concentrations in the gas discharge stack in order to detect an abnormally high level of emission of odorous pollutants which could lead to poor prediction of the concentrations of pollutants on the grid. Upon detection of an abnormally high value for the concentration of odorous pollutants, the method according to the invention allows the treatment-bypass line to be closed to avoid a possible atmospheric pollution of odorous molecules.

The method 20 according to the invention may also comprise a step 27 of receiving and taking into consideration gaseous pollutant concentration values measured by at least one gaseous pollutant sensor 14 arranged in the predefined geographical zone. If the comparison 28 of the reference value associated with a grid point corresponding to the position of the gaseous pollutant sensor 14 reveals a gaseous pollutant concentration value higher than said reference value then an instruction to close the bypass line 8 may be transmitted directly to the damper 9.

The steps 26, 27 of taking into account and 25, 28 of comparing the values coming from the sensors 7, 14, 15 are performed in parallel with the steps 22 of forecasting the gaseous pollutant concentration values and 23 of comparing the predicted gaseous-pollutant concentration values with a reference value. If a difference between the predicted meteorological data and the measured meteorological data differ from a given threshold, then the damper 9 will remain closed and the bypass line 8 will also remain closed, for example until the previous difference drops below the given threshold. Likewise, if a measured value for the gaseous pollutant concentration at at least one grid point exceeds the associated reference value, then the damper 9 of the bypass line 8 will remain closed at least until all the measured gaseous pollutant concentration values drop back below the reference value.

Figure 3A:
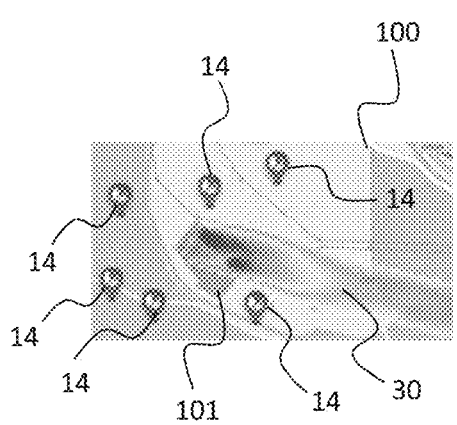
FIG. 3a depicts a plume of odorous gas in a determined geographical zone with no treatment of the foul gas at a first instant t3.
Figure 3B:
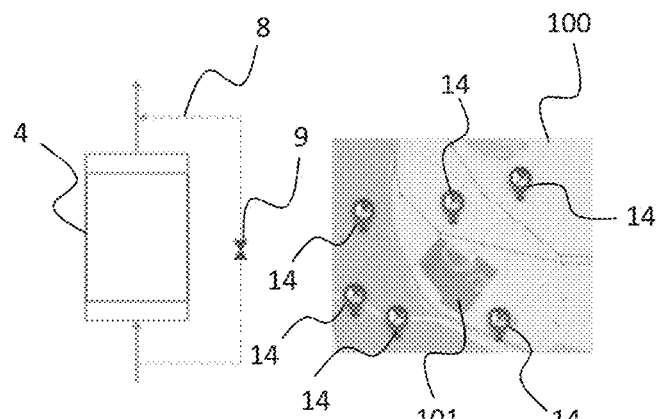
FIG. 3b depicts the state of operation of the gas treatment bypass device according to the invention at the first instant t3.
Figure 3C:
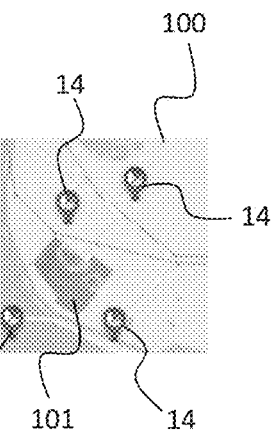
FIG. 3c depicts a first result on the plume of odorous gas in the determined geographic zone of applying the method according to the invention at the first instant t3.

FIG. 3*a* depicts a geographical zone surrounding a gas stream emission zone. In FIG. 3*a*, a plume of pollution 30 of odorous molecules is depicted, in a determined geographical zone, without treatment of the foul gas, at a first instant t3. In a status of the system according to the invention as depicted in FIG. 3*b*, in which the damper for opening the air treatment device bypass line is closed, then the true situation, at the first instant t3, represented in FIG. 3*c*, reveals that the plume of pollution has disappeared: the air stream emitted is correctly filtered, the level of odorous molecules present in the environment is below the reference value.

Figure 4A:
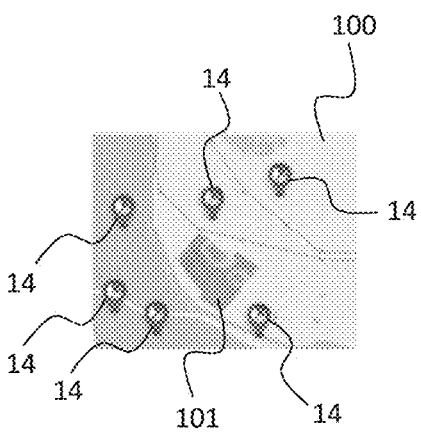
FIG. 4a depicts a plume of odorous gas in a determined geographical zone without treatment of the foul gas at a second instant t4.
Figure 4B:
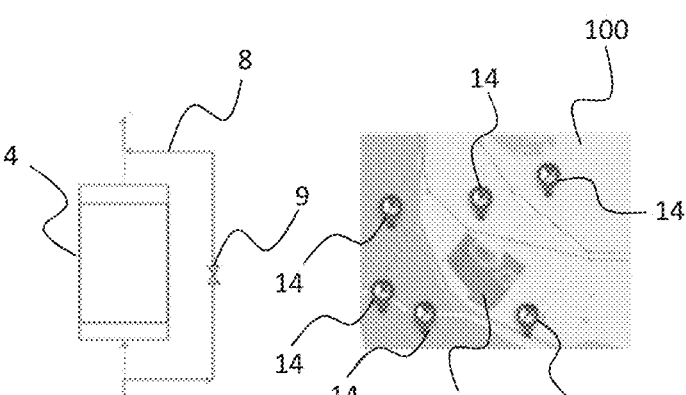
FIG. 4b depicts the mode of operation of the gas treatment bypass device according to the invention at the second instant t4.
Figure 4C:
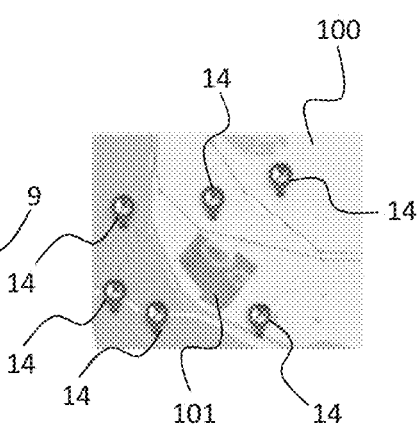
FIG. 4c depicts a second result on the plume of odorous gas in the determined geographical zone, of the method according to the invention at the second instant t4.

FIG. 4*a* depicts a plume of pollution of odorous molecules in a determined geographical zone without treatment of the foul gas, at a second instant t4. FIG. 4*a* depicts a situation in which the plume of odorous molecules emitted disperses rapidly and does not generate any olfactory pollution. In that case, the system according to the invention may be in the status depicted in FIG. 4*b* at the second instant t4: the bypass line 8 is entirely operational, the damper 9 is fully open, and the treatment unit is thus said to be in a "bypass" status. It may then be observed that this has no impact on the situation depicted in real time in FIG. 4*c*, at the second instant t4.

The use of the invention makes it possible to reduce the actual operational time, for example of an adsorption unit installed at the end of an air flow treatment, by the order of 40%. Advantageously, the invention allows the odorous air to be treated only when doing so is truly necessary. For example, this may be the case when the meteorological conditions are not favorable to a dispersion of the emitted odors. Thus, the use time and therefore the maintenance time of the treatment equipment and the waste generated by this equipment are improved. Advantageously, the invention allows optimization of the use of the foul air flow treatment resources while at the same time guaranteeing an olfactory impact on the environment that is identical to that obtained with continuous operation of the treatments of the outgoing air stream. Advantageously, the use of adsorption treatments is particularly well suited to the invention because this type of treatment does not entail any latency time either when stopping the treatment or when resuming same.

The various embodiments of the present invention comprise various steps. These steps can be implemented by instruction from a machine that can be executable by means of a microprocessor for example. Alternatively, these steps may be performed by specific integrated circuits containing logic wired to execute the steps, or through any combination of programmable components and of customized components.

The invention claimed is:

1. A method for managing a foul gas treatment device comprising:
    a) a gas treatment unit, the treatment unit comprising a dispersion stack,
    b) a bypass airline bypassing the treatment unit,
    c) a control unit configured to operate the bypass airline in a mode to bypass at least part of the treatment unit,
    d) a computer implementing the method for managing the gas treatment device,
the method for managing the foul gas treatment device further comprising:
    e) considering forecasts of gaseous pollutant concentrations at at least one point of a predefined geographical zone with at least one processor of the computer;
    f) comparing the predicted gaseous pollutant concentration at the at least one point of the predefined geographical zone with a gaseous pollutant concentration reference value, implemented by the at least one processor;
    g) transmitting from the computer to the bypass airline control unit an instruction to at least partially open the bypass airline bypassing the gas-treatment unit when the result of the comparison indicates that at least one predicted gaseous pollutant concentration value is below a gaseous pollutant concentration reference value; and
    (h) the method being repeated at defined time intervals.

2. The method for managing a foul gas treatment device as claimed in claim 1, further comprising:
    the computer receiving forecast meteorological data; and a model of the atmospheric dispersion of the foul gas molecules as a function of the forecast meteorological data received and of a predefined concentration of untreated discharged odorous pollutants, forecasting gaseous pollutant concentration values at the at least one point in the predefined geographical zone, the model being implemented by the processor.

3. The method for managing a foul gas treatment device as claimed in claim 2, wherein the model of the atmospheric dispersion of the foul gas molecules over the predefined geographical zone takes account of the topography of the predefined geographical zone.

4. The method for managing a foul gas treatment device as claimed in claim 1, further comprising:
    receiving at least one gaseous pollutant concentration value measured by at least one sensor;

comparing the at least one measured gaseous pollutant concentration value with the gaseous pollutant concentration reference value;

transmitting to the control unit that controls the bypass airline bypassing the treatment unit, of a command to at least partially close the bypass airline, when the result of the comparison indicates that at least one measured gaseous pollutant concentration value is above the gaseous pollutant concentration reference value.

5. The method for managing a foul gas treatment device as claimed in claim 2, wherein the meteorological data comprise a temperature, a wind speed and direction, a level of cloud cover or a level of solar radiation, at the at least one point in the predefined geographical zone.

6. The method for managing a foul gas treatment device as claimed in claim 1, wherein the gaseous pollutant concentration reference value differs according to the position of the point in the predefined geographical zone.

7. The method for managing a foul gas treatment device as claimed in claim 1, wherein the gaseous pollutant concentration reference value is a concentration target value below a maximum permissible value.

8. The method for managing a foul gas treatment device as claimed in claim 2, wherein the gas treatment device further comprises a gas dispersion unit downstream of the gas treatment unit according to a direction of flow of the gases through the gas treatment device, the gas dispersion unit being situated downstream of the outlet of the bypass airline, the method comprises a step of adjusting an air flow rate of the gas dispersion unit according to the calculation for predicting a gaseous pollutant concentration value at the at least one point of the predefined geographical zone.

9. The method for managing a foul gas treatment device as claimed in claim 1, wherein a defined time interval is of an order of around 15 minutes.

10. A foul gas treatment device comprising:
(a) a gas treatment unit;
(b) a bypass airline bypassing part of the gas treatment unit;
(c) a computer comprising at least one processor configured to calculate instructions at least for opening and closing the bypass airline according to data forecasting a concentration of gaseous pollutants in a predefined geographical zone;
(d) a control unit configured to control the bypass airline and configured to receive instructions to open and close the bypass airline coming from the at least one processor and able to apply the instructions to open and to close the bypass airline;
(e) the at least one processor being configured to compare the predicted gaseous pollutant concentration at at least one point of the predefined geographical zone with a gaseous pollutant concentration reference value; and
(f) the computer being configured to transmit an instruction to a control unit associated with the bypass airline, to at least partially open the bypass airline bypassing the gas-treatment unit when the result of the comparison indicates that at least one predicted gaseous pollutant concentration value is below the gaseous pollutant concentration reference value.

11. The foul gas treatment device as claimed in claim 10, wherein the at least one processor is connected to an interface dedicated to receiving data forecasting the concentration of gaseous pollutants in the predefined geographical zone.

12. The foul gas treatment device as claimed in claim 10, wherein the at least one processor is configured to calculate forecast concentrations of gaseous pollutants over the predefined geographical zone, the at least one processor being connected by a dedicated interface to a meteorological data server.

13. The foul gas treatment device as claimed in claim 12, wherein the at least one processor is connected via dedicated interfaces to one or more sensors comprising at least one of:
odorous gas sensors distributed over the predefined geographical zone;
meteorological data sensors;
an odorous gas sensor arranged at a discharge stack of the foul gas treatment device.

14. The foul gas treatment device as claimed in claim 10, wherein the at least one part of the gas treatment unit is an adsorption filtration unit.

15. The foul gas treatment device as claimed in claim 14, wherein the filtration unit is an active carbon filter.

* * * * *